United States Patent Office 3,066,878
Patented Dec. 4, 1962

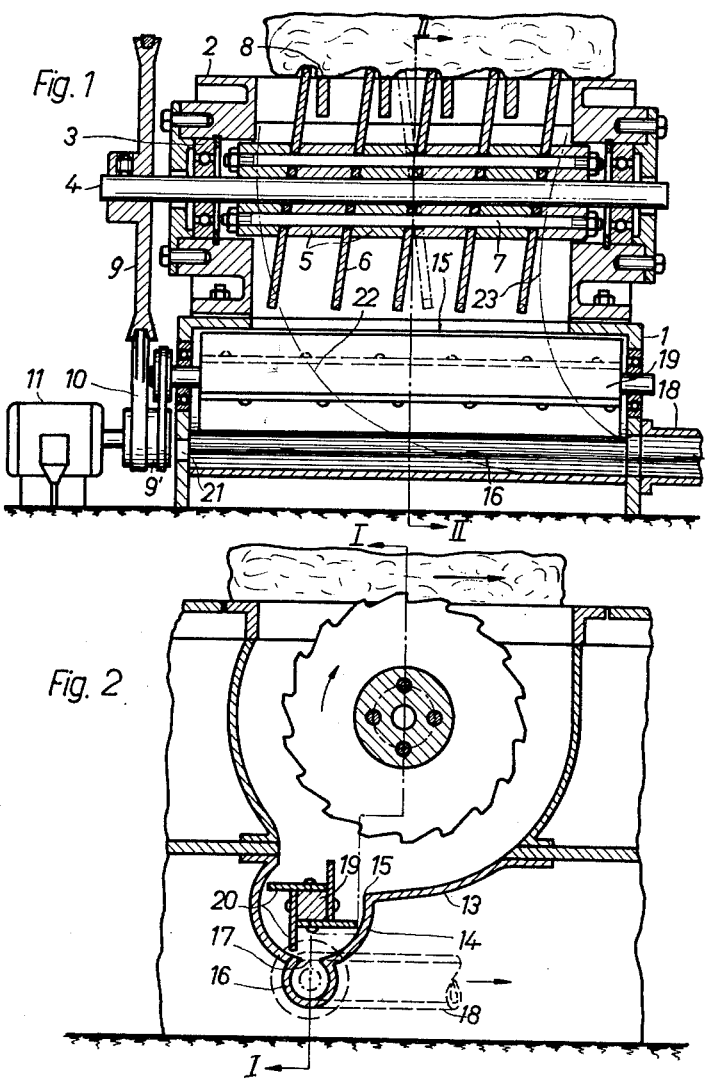

3,066,878
BALE RASP
Rudolf Wildbolz, Winterthur, Switzerland, assignor to Rieter Machine Works Ltd., Winterthur, Switzerland, a corporation of Switzerland
Filed Oct. 23, 1961, Ser. No. 146,716
Claims priority, application Switzerland Oct. 31, 1960
2 Claims. (Cl. 241—277)

The present invention relates to a bale rasp for mechanically reducing pressed fibre bales, as used in spinning plants.

Bale rasps having a rotating reducing device including beaters or saw-tooth discs are preferably made as long as possible in the axial direction of the reducing device to provide as much work space as possible for each beater or saw-tooth disc. In conventional bale rasps the space in a casing for the reducing device below the latter is connected to a vacuum system which produces a downward air current through the grate above the beater or saw-tooth discs and through the casing of the reducing device for removing the fibres separated from the bale. The conventional arrangement has several disadvantages. Depending on the size of the bales passing over the grate, the latter is nearly completely or entirely covered whereby the air current is stopped exactly at the times when there is a great amount of loose fibres in the casing of the reducing device. These fibres accumulate below the beaters or saw-tooth discs and are suddenly removed when a bale has passed the grate and a suction current can develop. If several bale rasp units of this type are connected to a common duct for conveying the loosened fibres and the relative operation of the rasps is not carefully controlled, fibre accumulations may occur which plug the vacuum transport system. The air tends to take the shortest possible route through the grate and the casing of the reducing device to the discharge opening which results in fibre accumulations at locations which cannot be passed by the air at sufficient speed. This is particularly the case in apparatus having long beaters which are desirable for other reasons.

It is an object of the present invention to provide an improved oblong bale rasp which avoids the aforedescribed shortcomings of conventional rasps. This object is attained by providing a rotatable sluice whose rotation axis is parallel to the rotation axis of the beaters or other bale reducing elements, the sluice including an oblong housing having a slot communicating the interior of the sluice housing with the space wherein the reducing elements operate and having a second slot communicating the interior of the housing with a suction duct through which the loosened fibres are removed from the bale rasp.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1 is a longitudinal sectional view of a bale rasp according to the invention, the section being made along line I—I of FIG. 2.

FIG. 2 is a cross sectional view of the bale rasp shown in FIG. 1, along line II—II of said figure.

Referring more particularly to the drawing, numeral 1 designates a base on which an upper structure 2 is mounted which supports bearings 3 for a shaft 4. The latter supports saw-tooth discs 6 which are equally spaced by cylindrical spacers 5 and held together by bolts 7. The end faces of the spacers 5 are inclined with respect to the rotation axis of the shaft 4 so that the saw-tooth discs 6 are located in planes which are not normal to the shaft 4. The bale reducing device composed of the shaft 4, the spacers 5 and the saw-tooth discs 6 has a considerable length which is at least as great as the diameter of the saw-tooth discs. Grate bars 8 are provided in the upper part of the device and extend between the saw-tooth discs for supporting the bales which must be reduced. A pulley 9 is mounted to one end of the shaft 4 and is driven through a belt 10 by a pulley 9' mounted on the shaft of a motor 11. The bale reducing device operates in a casing 13 supported by the base 1 and having a portion 14 which communicates with the main part of the casing through a slot 15 which is parallel to the rotation axis of the reducing device. The lower part of the portion 14 forms an oblong pneumatic transport channel 16 whose interior communicates with the interior of the portion 14 through a slot 17 which is also parallel to the rotation axis of the reducing device. The pneumatic transport channel 16 is connected through a pipe line 18 to a vacuum producing system which is not shown. The portion 14 is cylindrical and contains a rotatable sluice 19 in coaxial position. The sluice is provided with gate elements 20 which periodically connect and disconnect the suction channel 16 with and from the casing portion 14. The sluice 19 is connected by a belt drive to the motor 11 to be driven thereby. An air inlet 21 is provided at the left end of the channel 16 and the pipe 18 is connected to the right end of the channel 16 so that air is continuously drawn in axial direction through the channel 16.

The apparatus operates as follows:

The fibre material torn from a bale by the teeth of the discs 6 is thrown by centrifugal force onto the gate elements 20 of the sluice 19 and is transported by the sluice into the pneumatic transport channel 16 wherein the fibres are carried in axial direction by the air current in the channel 16. If there would not be a sluice as described and illustrated, sufficient air current would only exist in a relatively small zone extending between the dash-dot lines 22 and 23 in FIG. 1. Particularly at the left lower half of the casing of the bale reducing device loosened fibres would accumulate which eventually would prevent passage of fibres into the channel 16. This is effectively and reliably prevented by the provision of the sluice arrangement according to the invention.

I claim:
1. A bale rasp for reducing compressed fibre bales comprising an oblong casing, an oblong bale reducing device rotatably mounted in said casing, a cylindrical housing longitudinally connected to said casing, a slot at the connection of said casing and said housing for communicating the interior of said casing with the interior of said housing, an oblong pneumatic transport channel longitudinally connected to said housing, a slot at the connection of said housing and said channel for communicating the interior of said housing with the interior of said channel, and an oblong sluice gate coaxially rotatable in said housing for transporting fibres loosened by said reducing device from the fibre bales from said casing into said transport channel.

2. A bale rasp as defined in claim 1 wherein said casing, said housing and said channel are in one piece.

References Cited in the file of this patent
UNITED STATES PATENTS
Re. 7,264     Thompson _____ Aug. 15, 1876
1,999,607    Hagmaier et al. _____ Apr. 30, 1935